United States Patent
Fuse

(10) Patent No.: US 7,226,168 B2
(45) Date of Patent: Jun. 5, 2007

(54) PROJECTOR SYSTEM FOR LIGHT MODULATION DEVICE

(75) Inventor: Makoto Fuse, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

(21) Appl. No.: 11/061,468

(22) Filed: Feb. 22, 2005

(65) Prior Publication Data

US 2005/0195371 A1   Sep. 8, 2005

(30) Foreign Application Priority Data

Feb. 20, 2004   (JP)   ............................. 2004-044651
Dec. 2, 2004    (JP)   ............................. 2004-349439

(51) Int. Cl.
G03B 21/00   (2006.01)
G03B 21/14   (2006.01)
G03B 21/20   (2006.01)

(52) U.S. Cl. ........................ 353/31; 353/69; 353/102

(58) Field of Classification Search ................ 353/30, 353/31, 33, 34, 69, 81, 82, 84, 122, 102; 359/494, 495, 496, 634, 639, 640, 831; 349/5, 349/7

See application file for complete search history.

(56) References Cited

U.S. PATENT DOCUMENTS 6,042,234 A    3/2000   Itoh  ............................. 353/20
6,942,347 B2 *  9/2005  Sugawara et al. ............ 353/33
2002/0113949 A1 *  8/2002  Sugawara ..................... 353/31

FOREIGN PATENT DOCUMENTS

CN    1228544 A    9/1999
JP    A 1-243014   9/1989

\* cited by examiner

*Primary Examiner*—Melissa Jan Koval
(74) *Attorney, Agent, or Firm*—Oliff & Berridge, PLC

(57) ABSTRACT

Aspects of the invention can provide a projector capable of projecting a high-quality image by illumination that does not produce a difference in size among illumination areas for respective colors including red, green, and blue. A light-source light from a light source can be separated into color lights by first and second dichroic mirrors provided in a color separation system, which independently go incident on corresponding liquid crystal light valves as illumination lights. Herein, a mutual chromatic aberration can be corrected by adjusting, as needed, the radii of curvature of respective field lenses provided in the color separation system for use in adjusting angles of incidence of illumination lights with respect to the liquid crystal light valves. This configuration makes it possible to illuminate the respective liquid crystal light valves by illumination areas of exactly the same size, which in turn enables a high-quality image having no display shadow to be projected.

20 Claims, 6 Drawing Sheets

PROJECTOR SYSTEM FOR LIGHT MODULATION DEVICE

BACKGROUND

Aspects of the invention can relate to a projector that projects an image with the use of a liquid crystal display panel or any other type of light modulation device.

As an illumination device for a liquid crystal display panel incorporated into a projector in the related art, a type in which a light-source light from a white light source is separated into lights of three colors and relay lenses are disposed in illumination optical paths for two colors, so that efficiency for utilization of illumination of respective colors is improved by compensating for a difference of optical path lengths with respect to the remaining one color can be used. See, for example, JP-A-1-243014.

SUMMARY

In the related art projector described above, however, identical optical systems including lenses having the same radius of curvature or the like can be incorporated into a pair of illumination optical paths into which the relay lenses are incorporated. This causes illumination areas projected onto the liquid crystal light valves for respective colors to vary in size with a difference of the wavelength characteristics between the two illumination optical paths. Such a difference in size among the illumination areas will produce a colored display shadow on the fringe of a projected image, and possibly results in a failure.

An object of the invention can be to provide a projector capable of projecting a high-quality image by illumination that does not produce a difference in size among illumination areas for respective colors including red (R), green (G), and blue (B).

An exemplary projector of the invention can include a color separation system to cause illumination lights of first through third colors to branch from a light-source light emitted from a light source and guide the illumination lights of the first through third colors to first through third optical paths, respectively, and first through third light modulation devices to be illuminated, respectively, by the illumination lights of the first through third colors and independently modulate the illumination lights of their respective colors. A distance from the light source to the third light modulation device can be different from a distance from the light source to the first light modulation device and a distance from the light source to the second light modulation device, and a relay system can be disposed in each of the first and second optical paths or in the third optical path alone. Also, a correcting system to correct a chromatic aberration that gives an influence to sizes of illumination areas, for at least the first color and the second color when an angle distribution of the illumination lights of the first through third colors that respectively go incident on the first through third light modulation devices is adjusted, is disposed in the first through third optical paths.

In the exemplary projector described above, the correcting system corrects a chromatic aberration that gives an influence to sizes of illumination areas, for at least the first color and the second color. Hence, at least the first and second light modulation devices are illuminated by illumination areas of the same size. It is thus possible to prevent a display shadow from being produced on the fringe of a projected image or reduce the production of such a display shadow, which in turn enables a high-quality image to be projected.

A chromatic aberration that gives an influence to sizes of illumination areas can refer to a chromatic aberration (a chromatic aberration of magnification and a longitudinal chromatic aberration) induced by all or part of lenses (including a concave mirror and a lens array) disposed in optical paths from the light source to the light modulation devices. Hereinafter, a chromatic aberration that gives an influence to sizes of illumination areas can refer to as a chromatic aberration.

According to an aspect of the invention, in the exemplary projector, the correcting system can include first and second field lenses each having a different refractive power with respect to a reference wavelength and disposed, respectively, in the first and second optical paths oppositely to light-incident surface sides of the first and second light modulation devices, and a third field lens disposed in the third optical path oppositely to a light-incident surface side of the third light modulation device. In this case, by setting refractive powers of the first and second field lenses disposed, respectively, in the optical paths of illumination lights of the first and second colors and having the same length of optical path from the light source to the light modulation device, it is possible to illuminate the first and second light modulation devices by illumination areas of the same size.

According to another aspect of the invention, the refractive power of the first field lens for the first color can be almost equal to the refractive power of the second field lens for the second color. In this case, an aberration can be corrected mutually for illumination lights of first and second colors.

According to still another aspect of the invention, the relay system can be disposed in the third optical path. In this case, the need to dispose the relay systems in the first and second optical paths is eliminated, and the illumination device can be of a simple structure.

According to still another aspect of the invention, the first and second field lenses can be planoconvex lenses having flat surfaces, respectively, on sides of the first and second light modulation devices. In this case, it is possible to adjust an angle of incidence with respect to the first and second light modulation devices to achieve satisfactory properties.

According to still another aspect of the invention, with the first through third colors being blue, green, and red, respectively, and Rb and Rg being radii of curvature of the first and second field lenses, respectively, an inequality as follows is satisfied: Rb>Rg. In this case, red can serve as a relay system, and color correction between green and blue with the use of curvatures of the field lenses can be achieved.

The radius of curvature referred to herein can mean the radius of curvature of a convex surface when the field lens is a planoconvex lens. When the both surfaces of the field lens are curved surfaces, the field lens is replaced with a virtual planoconvex lens having the same refractive power, and the radius of curvature can mean the radius curvature of the convex surface of this virtual planoconvex lens. The same applies to the description below. When the both surfaces of the field lens are in the shape of a lens, the radius of curvature, R, is given as an approximation by an equation as follows:

$$R = R1 \times R2 (R1 + R2),$$

where R1 is the absolute value of the radius of curvature of the first surface of the field lens, and R2 is the absolute value of the radius of curvature of the second surface.

According to still another aspect of the invention, with Rr being a radius of curvature of the third field lens, an inequality as follows is satisfied: $Rg \geq Rr$. In this case, it is possible to correct a chromatic aberration for red resulted from the relay system.

According to still another aspect of the invention, with the first through third colors being red, green, and blue, respectively, and Rr and Rg being radii of curvature of the first and second field lenses, respectively, an inequality as follows can be satisfied: $Rg > Rr$. In this case, blue can serve as a relay system, and color correction between green and red with the use of curvatures of the field lenses can be achieved.

According to still another aspect of the invention, with Rb being a radius of curvature of the third field lens, then an inequality as follows can be satisfied: $Rr \geq Rb$. In this case, it is possible to correct a chromatic aberration for blue resulted from the relay system.

According to still another aspect of the invention, with the first through third colors being blue, red, and green, respectively, and Rb and Rr being radii of curvature of the first and second field lenses, respectively, an inequality as follows can be satisfied: $Rb > Rr$. In this case, green serves as a relay system, and color correction between blue and red with the use of curvatures of the field lenses can be achieved.

According to still another aspect of the invention, with Rg being a radius of curvature of the third field lens, an inequality as follows can be satisfied: $Rr \geq Rg$. In this case, a chromatic aberration for green resulted from the relay system can be corrected.

According to still another aspect of the invention, the relay system is disposed in each of the first and second optical paths. In this case, it is possible to shorten the overall distance from the light source to the light modulation devices.

According to still another aspect of the invention, the third field lens can be a planoconvex lens having a flat surface on a side of the third light modulation device. In this case, it is possible to adjust an angle of incidence with respect to the third light modulation device to achieve satisfactory properties.

According to still another aspect of the invention, with the first through third colors being red, blue, and green, respectively, and Rr and Rb being radii of curvature of the first and second field lenses, respectively, then an inequality as follows can be satisfied: $Rb > Rr$. In this case, red and blue serve as relay systems, and color correction between red and blue with the use of curvatures of the field lenses can be achieved.

According to still another aspect of the invention, with Rg being a radius of curvature of the third field lens, an inequality as follows can be satisfied: $Rg \geq Rb$. In this case, it is possible to correct a relative chromatic aberration with respect to green resulted from the absence of the relay system.

According to still another aspect of the invention, with the first through third colors be red, green, and blue, respectively, and Rr and Rg being radii of curvature of the first and second field lenses, respectively, an inequality as follows can be satisfied: $Rg > Rr$. In this case, red and green can serve as relay systems, and color correction between red and green with the use of the curvatures of the field lenses can be achieved.

According to still another aspect of the invention, with Rb being a radius of curvature of the third field lens, an inequality as follows can be satisfied: $Rb > Rg$. In this case, it is possible to correct a relative chromatic aberration with respect to blue resulted from the absence of the relay system.

According to still another aspect of the invention, with the first through third colors being green, blue, and red, respectively, and Rg and Rb being radii of curvature of the first and second field lenses, respectively, an inequality as follows can be satisfied: $Rb > Rg$. In this case, green and blue can serve as relay systems, and color correction between green and blue with the use of curvatures of the field lenses can be achieved.

According to still another aspect of the invention, with Rr being a radius of curvature of the third field lens, an inequality as follows can be satisfied: $Rr \geq Rb$. In this case, it is possible to correct a relative chromatic aberration with respect to red resulted from the absence of the relay system.

According to still another aspect of the invention, a light combining member to combine and emit image lights of respective colors from the first through third light modulation devices, and a projection system to project the image lights that have been combined by passing through the light combining system are further included. In this case, the light modulation devices can be illuminated by illumination in which illumination areas are matched for at least the first and second light modulation devices. A high-quality color combined image having fewer display shadows can be thus projected.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Hereinafter, the structure of a projector according to a first exemplary embodiment of the invention will be described with reference to an accompanying drawing.

Figure 1:
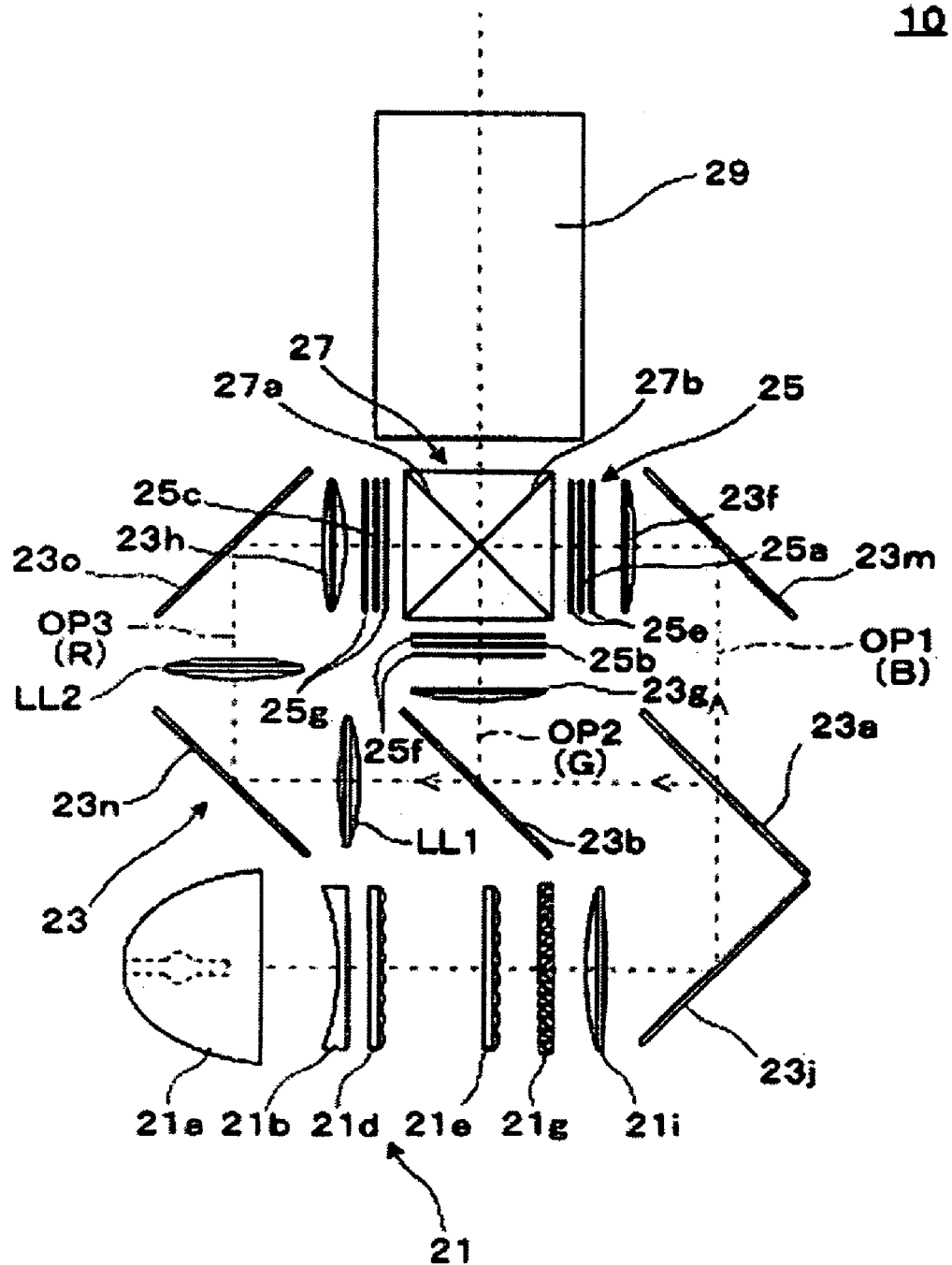
FIG. 1 is a view used to describe optical systems in a projector according to a first exemplary embodiment of the invention.

FIG. 1 is an exemplary block diagram used to describe optical systems in the projector of this embodiment. A projector 10 can include a light source 21 to generate a light-source light, a color separation system 23 to separate a light-source light from the light source 21 into lights of three colors including red, green and blue, a light modulation portion 25 illuminated by illumination lights of respective colors emitted from the color separation system 23, a cross dichroic prism 27 to combine image lights of respective colors from the light modulation portion 25, and a projection lens 29 serving as a projection system to project image lights that have passed through the cross dichroic prism 27 onto a screen (not shown).

The light source 21 can include a light source lamp 21a, a concave lens 21b, a pair of fly's-eye systems 21d and 21e, a polarization converting member 21g, and a superimposing lens 21i. Of these components, the light source lamp 21a can include, for example, a high pressure mercury-vapor lamp, and is provided with a concave mirror that collects light-source lights to be emitted forward. The concave lens 21b plays a role in making light-source lights from the light source lamp 21a parallel. The concave lens 21b can obtain parallel light beams when the concave mirror is of a sphere or an ellipsoid; however, it can be omitted when the concave mirror is a parabolic mirror.

The pair of fly's-eye systems 21d and 21e can include plural element lenses arrayed in a matrix fashion, and these element lenses separate light-source lights from the light source lamp 21a having passed through the concave lens 21b to be independently collected or diffused. The polarization converting member 21g converts light-source lights emitted from the fly's-eye system 21e, for example, to only S-polarized components perpendicular to the sheet surface of FIG. 1, which are supplied to an optical system in the following stage. The superimposing lens 21i enables superimposed illumination for the light modulation devices for respective colors provided in the light modulation portion 25 by forcing the illumination lights having passed through the polarization converting member 21g to be converged as a whole as needed. In other words, illumination lights that have passed through the both fly's-eye systems 21d and 21e and the superimposing lens 21i pass through the color separation system 23, which will be described in detail below, and are superimposed to illuminate homogeneously the light modulation devices for respective colors, that is, liquid crystal light valves 25a, 25b, and 25c, provided in the light modulation portion 25.

The color separation system 23 can include first and second dichroic mirrors 23a and 23b, three field lenses 23f, 23g, and 23h serving as correcting systems, and reflection mirrors, 23j, 23m, 23n, and 23o, and constitutes an illumination device together with the light source 21. Of the lights of three colors including red, green, and blue, the first dichroic mirror 23a reflects a red light and a green light and transmits a blue light. Of the incident lights of two colors including red and green, the second dichroic mirror 23b reflects the green light and transmits the red light.

In the color separation system 23, a substantially white light-source light from the light source 21 is deflected by the reflection mirror 23j to go incident on the first dichroic mirror 23a. The blue light having passed through the first dichroic mirror 23a goes incident on the field lens 23f by way of the reflection mirror 23m while remaining intact, for example, in the form of an S-polarized light. The green light, having been reflected on the first dichroic mirror 23a and further on the second dichroic mirror 23b, goes incident on the field lens 23g while remaining intact, for example, in the form of an S-polarized light. Further, the red light having passed through the second dichroic mirror 23b goes incident on the field lens 23h for use in adjusting an angle of incidence by way of lenses LL1 and LL2 and the reflection mirrors 23n and 23o while remaining intact, for example, in the form of an S-polarized light. The lenses LL1 and LL2 and the field lens 23h together constitute a relay system.

The relay system is furnished with a function of delivering an image from the first lens LL1 almost intact to the field lens 23h via the second lens LL2. A distance from the light source 21 to the liquid crystal light valve 25c is longer than distances from the light source 21 to the liquid crystal light valves 25a and 25b. However, by disposing the relay system in an optical path OP3, it is possible to prevent, to some extent, a decrease in efficiency for light utilization caused by light diffusion or the like induced from such a difference among optical paths.

The light modulation portion 25 can include three liquid crystal light valves 25a through 25c each serving as a light modulation device, and three pairs of polarizing filters 25e, 25f, and 25g that are disposed to sandwich the liquid crystal light valves 25a through 25c, respectively. The blue light branched by passing through the first dichroic mirror 23a in the color separation system 23 goes incident on the first liquid crystal light valve 25a for blue lights via the field lens 23f. The green light branched by being reflected on the second dichroic mirror 23b in the color separation system 23 goes incident on the second liquid crystal light valve 25b for green lights via the field lens 23g. The red light branched by passing through the second dichroic mirror 23b goes incident on the third liquid crystal light valve 25c for red lights via the field lens 23h.

Each of the liquid crystal light valves 25a through 25c can be a non-luminous light modulation device that modulates a spatial intensity distribution of an incident illumination light. Lights of three colors that come incident on the respective liquid crystal light valves 25a through 25c are modulated in response to driving signals or image signals inputted into the respective liquid crystal light valves 25a through 25c as electrical signals. In this instance, the polarizing filters 25e, 25f, and 25g not only adjust the polarization directions of illumination lights to go incident on the respective liquid crystal light valves 25a through 25c, but also take out, as image lights, component lights in a specific polarization direction from modulated lights emitted from the respective liquid crystal light valves 25a through 25c.

The cross dichroic prism 27 is a light combining member, and can include two kinds of dielectric multi-layer films 27a and 27b formed in the shape of a capital X. In the cross dichroic prism 27 of this embodiment, a dielectric multi-layer film 27a for reflecting blue lights and a dielectric multi-layer film 27b for reflecting red lights are incorporated so as to cross with each other at right angles. The cross dichroic prism 27 emits a blue image light from the liquid crystal light valve 25a to the right in the traveling direction by reflecting the blue image light on the dielectric multi-layer film 27a, and emits a green image light from the liquid crystal light valve 25b to travel straight via the dielectric multi-layer films 27a and 27b while emitting a red image light from the liquid crystal light valve 25c to the left in the traveling direction by reflecting the red image light on the dielectric multi-layer film 27b.

The projection lens 29 can project color image lights combined by the cross dichroic prism 27 onto a screen (not shown) at a desired fixed scaling factor or within a desired scaling range. In other words, a color moving image or a color still image at a desired scaling factor corresponding to driving signals or image signals inputted into the respective light valves 25a through 25c is projected at a desired scaling factor.

The color separation system 23 in the projector 10 as described above will now be described in detail. In the color separation system 23, a first optical path OP1 that passes through the first dichroic mirror 23a to travel toward the field lens 23f serves as an optical path for blue lights, that is, a first color, as has been described. In addition, a second optical path OP2 that is reflected on the first dichroic mirror 23a and is reflected on the second dichroic mirror 23b to travel toward the field lens 23g serves as an optical path for green lights, that is, a second color, as has been described above. Further, a third optical path OP3 that passes through the first and second dichroic mirrors 23a and 23b to travel toward the field lens 23h serves as an optical path for red lights as a third color.

In the color separation system 23 of this exemplary embodiment, the first field lens 23f disposed in the first optical path OP1 for blue lights and the second field lens 23g disposed in the second optical path OP2 for green lights comprise similar planoconvex lenses because of symmetry properties of the optical paths. Meanwhile, the third field lens 23h disposed in the third optical path OP3 for red lights can include a biconvex lens by taking image-forming characteristics of the lenses LL1 and LL2 or the like into account.

In addition, in this exemplary embodiment, with Rb, Rg, and Rr being the radii of curvature of the field lenses 23f, 23g, and 23h, respectively, an inequality as follows is satisfied:

$$Rb > Rg \geq Rr \tag{1}$$

In this exemplary embodiment, both the first and second field lenses 23f and 23g can include planoconvex lenses. However, one or both of the two field lenses 23f and 23g may comprise biconvex lenses.

In this exemplary embodiment, because an inequality, Rb>Rg, is satisfied, a refractive power at the same reference wavelength (for example, g-line) can be smaller in the first field lens 23f than in the second field lens 23g. Further, under these conditions, it is possible to make a refractive power of the first field lens 23f for blue lights equal to a refractive power of the second field lens 23g for green lights. In this case, because a chromatic aberration is corrected for blue and green, both the liquid crystal light valves 25a and 25b are illuminated by illumination areas of the same size.

Further, because an inequality, Rg≧Rr, is satisfied, it is possible to make a refractive power of the third field lens 23h for red lights equal to or greater than a refractive power of the second field lens 23g for green lights. This makes it possible to correct a chromatic aberration for red and green or the like, too. The configuration described above makes it possible to illuminate the respective liquid crystal light valves 25a, 25b, and 25c by illumination areas of the same size, and light modulation areas for respective colors provided in the respective liquid crystal light valves 25a through 25c are thereby illuminated, respectively, by illumination lights of red, green, and blue of the same size in agreement. It is thus possible to prevent or reduce a colored display shadow from being produced on the fringe of an image projected onto the screen by the projection lens 29, which in turn enables a high-quality image to be projected.

The radius of curvature of each of the field lenses 23f, 23g, and 23h will now be described in greater detail. In an exemplary manufacturing example, the ratio of the radii of curvature, Rb, Rg, and Rr, of the field lenses 23f, 23g, and 23h, respectively, is set as follows: Rb:Rg:Rr=1.2:1.0:0.4. This configuration makes it possible to bring illumination areas for respective colors including red, green, and blue into exact agreement, which can in turn prevent a display shadow from being produced on the fringe of a projected image.

Operations of the projector 10 of this exemplary embodiment will now be described. A light-source light from the light source 21 can be separated into color lights by the first and second dichroic mirrors 23a and 23b provided in the color separation system 23 to independently go incident on the corresponding liquid crystal light valves 25a through 25c as illumination lights. Each of the liquid crystal light valves 25a through 25c has a two-dimensional refractive power distribution because its state varies with an image signal from the outside, and thereby modulates an illumination light in a two-dimensional space pixel by pixel. The illumination lights modulated in the respective liquid crystal light valves 25a through 25c in this manner, that is, image lights of respective colors, are combined in the cross dichroic prism 27 and then go incident on the projection lens 29. The image lights that come incident on the projection lens 29 are projected onto the unillustrated screen as a color image. In this instance, a mutual chromatic aberration is corrected by adjusting, as needed, the radii of curvature, Rb, Rg, and Rr, of the respective field lenses 23f, 23g, and 23h provided in the color separation system 23 for use in adjusting angles of incidence of illumination lights with respect to the respective liquid crystal light valves 25a through 25c. Hence, the respective liquid crystal light valves 25a through 25c can be illuminated by illumination areas of exactly the same size without any waste. It is thus possible to project and display a high-quality color image having no display shadow.

In the projector 10 of the first exemplary embodiment as described above, of the lengths of the optical paths of illumination lights of respective colors (lengths of the optical paths from the light source 21 to the respective liquid crystal light valves 25a through 25c), the lengths of the optical paths for blue lights and green lights are made equal, whereas the length of the optical path for red lights is made longer than the others.

Figure 2:
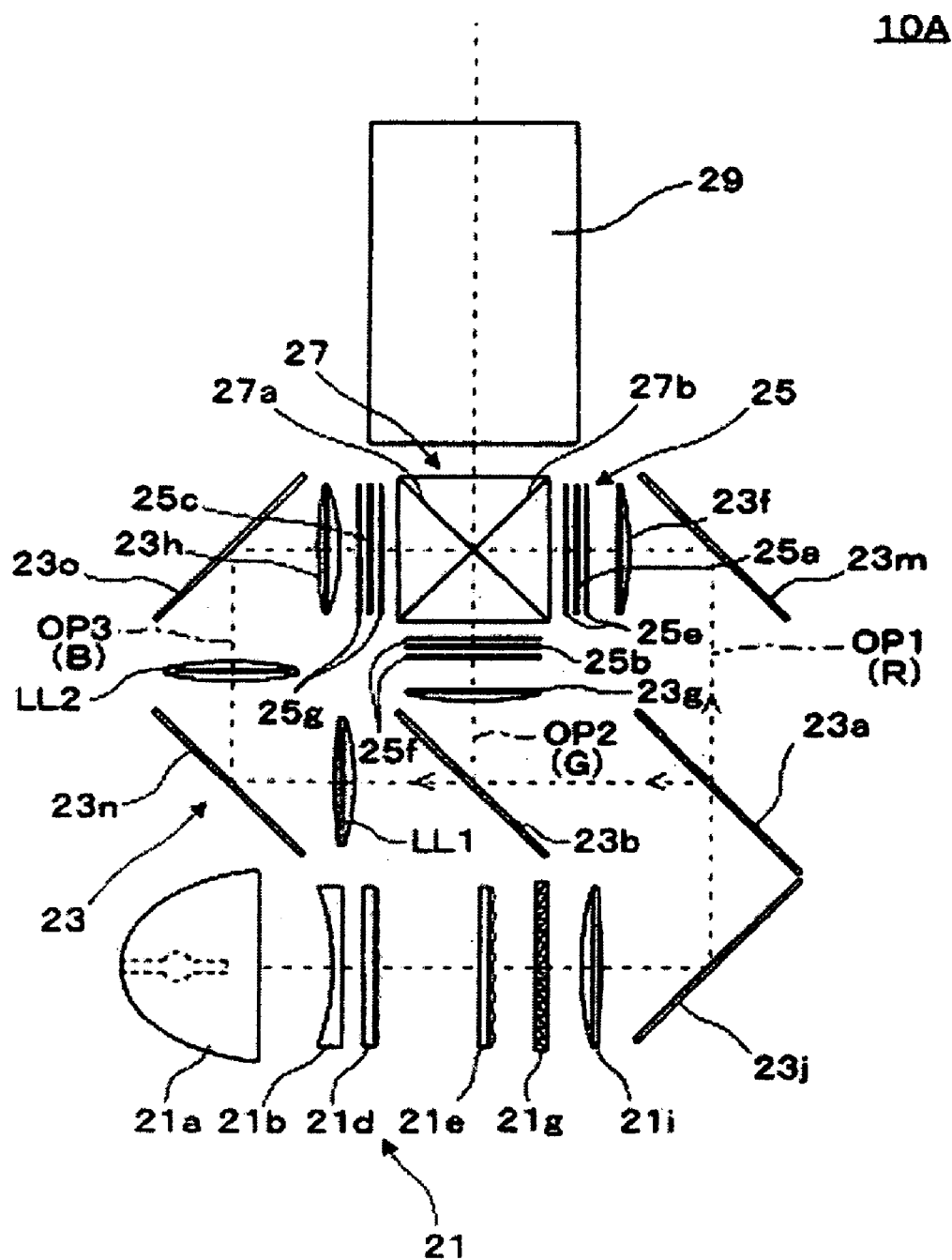
FIG. 2 is a view used to describe optical systems in a projector according to a second exemplary embodiment of the invention.

On the contrary, in a projector 10A of this exemplary embodiment, as is shown in FIG. 2, the length of the optical path for blue lights is made longer than the lengths of the optical paths for red lights and green lights. In addition, the lengths of the optical paths for red lights and green lights are made equal, while the relay system is inserted in the optical path for blue lights. The projector 10A of this exemplary embodiment is different from the counterpart of the first exemplary embodiment in displacement of color lights; however, other than this difference, it is configured in the same manner as the counterpart of the first exemplary embodiment.

In this exemplary embodiment, the first field lens 23f disposed in the first optical path OP1 for red lights and the second field lens 23g disposed in the second optical path OP2 for green lights comprise similar planoconvex lenses. Meanwhile, the third field lens 23h disposed in the third optical path OP3 for blue lights comprises a biconvex lens to be matched with the relay system in terms of image-forming characteristics or the like. Also, let Rr, Rg, and Rb be the radii of curvature of the first through third field lenses, respectively, then an inequality as follows is satisfied:

$$Rg > Rr \geq Rb \tag{2}$$

In this exemplary embodiment, both the first and second field lenses comprise planoconvex lenses. However, one or both of the two field lenses can include biconvex lenses.

In this exemplary embodiment, because an inequality, Rg>Rr, is satisfied, it is possible to make a refractive power of the first field lens 23f for red lights equal to a refractive power of the second field lens 23g for green lights, which makes it possible to correct a chromatic aberration for red and green. Also, because an inequality, Rr≧Rb, is satisfied, it is possible to match a refractive power of the third field lens 23h for blue lights with an illumination area having passed through the second field lens 23g for green lights. The configuration as described above makes it possible to correct a chromatic aberration for respective colors including red, green, and blue, and the respective liquid crystal light valves 25a, 25b, and 25c are thereby illuminated by illumination areas of the same size. It is thus possible to project a high-quality image by preventing or reducing a display shadow from being produced.

Figure 3:
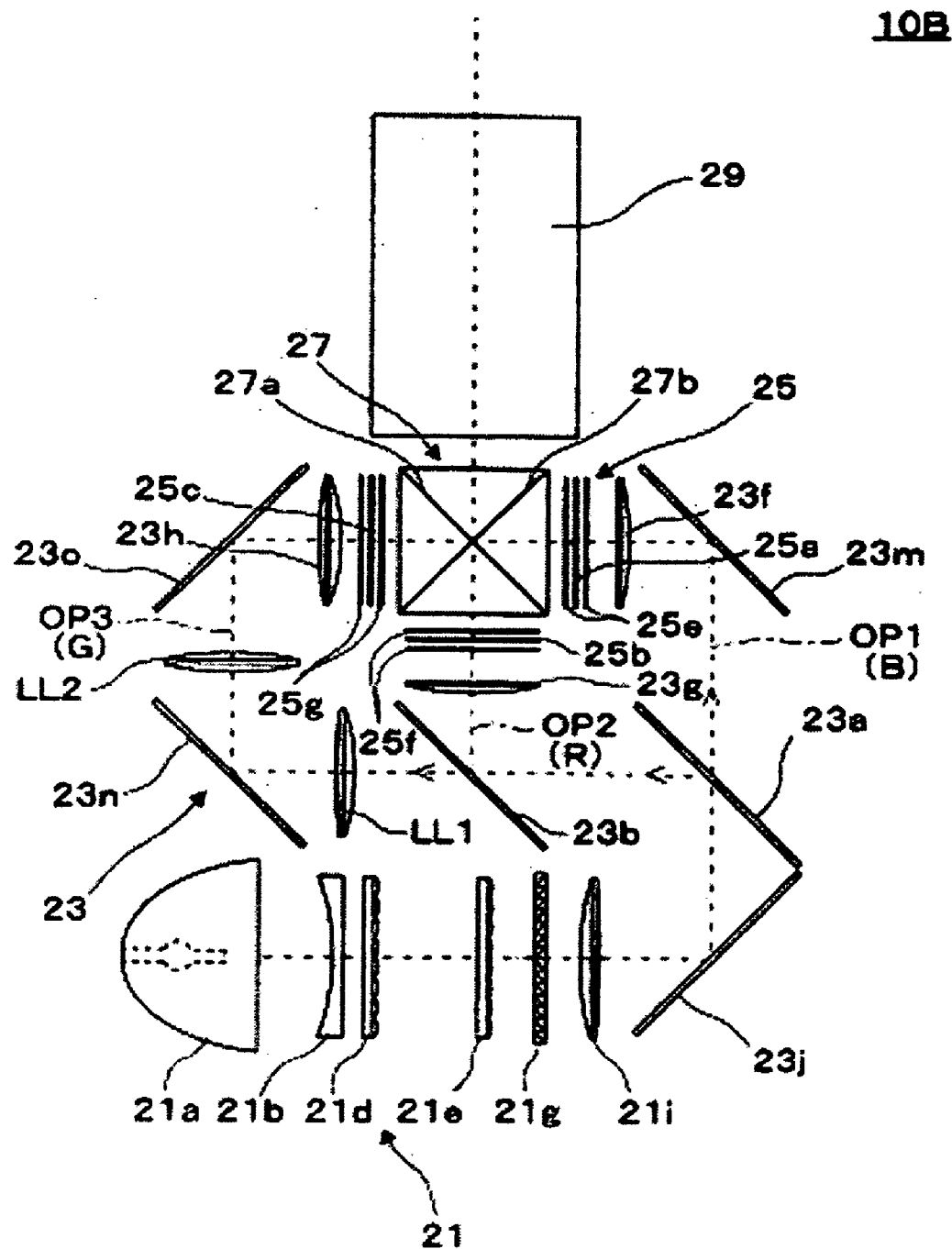
FIG. 3 is a view used to describe optical systems in a projector according to a third exemplary embodiment of the invention.

In a projector 10B of a third exemplary embodiment, as is shown in FIG. 3, of the lengths of the optical paths of illumination lights of respective colors (lengths of the optical paths from the light source 21 to the respective liquid crystal light valves 25a through 25c), the length of the optical path for green lights is made longer than the lengths of the optical paths for blue lights and red lights. In addition, the lengths of the optical paths for blue lights and red light can be made equal, while the relay system is inserted in the optical path for green lights. The projector 10B of this embodiment is different from the counterpart of the first exemplary embodiment in displacement of color lights; however, other than this difference, it is configured in the same manner as the counterpart of the first exemplary embodiment.

In this exemplary embodiment, the first field lens 23f disposed in the first optical path OP1 for blue lights and the second field lens 23g disposed in the second optical path OP2 for red lights can include similar planoconvex lenses. Meanwhile, the third field lens 23h disposed in the third optical path OP3 for green lights comprises a biconvex lens to be matched with the relay system in terms of image-forming characteristic or the like. In addition, let Rb, Rr, and Rg be the radii of curvature of the first through third field lenses, respectively, then an inequality as follows is satisfied:

$$Rb > Rr \geq Rg \quad (3)$$

In this embodiment, both the first and second field lenses can include planoconvex lenses. However, one or both of the two field lenses can include biconvex lenses.

In this exemplary embodiment, because an inequality, Rb>Rr, is satisfied, it is possible to make a refractive power of the first field lens 23f for blue lights equal to a refractive power of the second field lens 23g for red lights, which makes it possible to correct a chromatic aberration for blue and red. Likewise, because an inequality, Rr≥Rg, is satisfied, it is possible to match a refractive power of the third field lens 23h for green lights with an illumination area having passed through the second field lens 23g for red lights. The configuration as described above makes it possible to correct a chromatic aberration for respective colors including red, green, and blue, and the respective liquid crystal light valves 25a, 25b, and 25c are thereby illuminated by illumination areas of the same size. It is thus possible to project a high-quality image by preventing a display shadow from being produced.

Hereinafter, the structure of a projector according to a fourth exemplary embodiment will be described with reference to an accompanying drawing.

Figure 4:
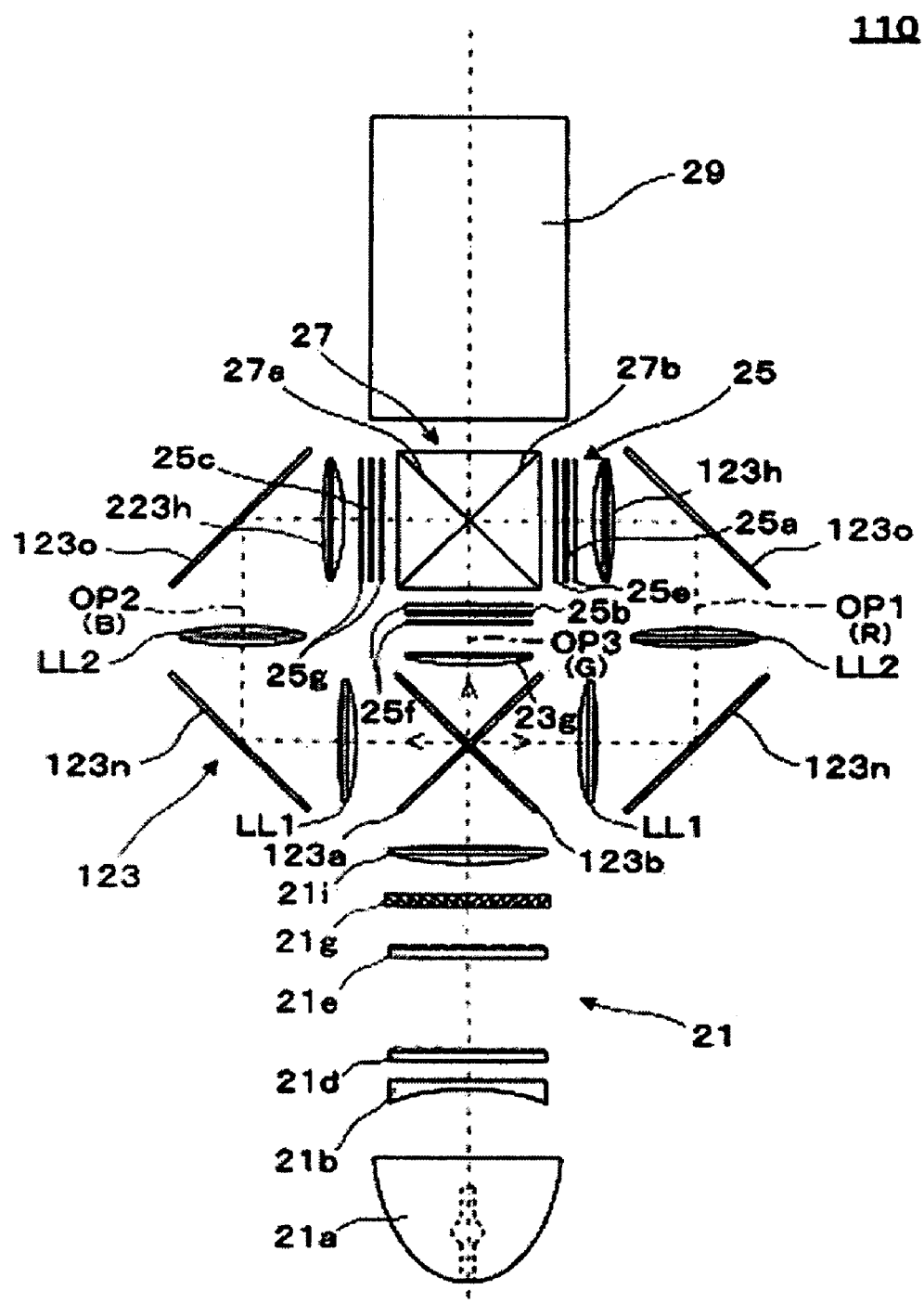
FIG. 4 is a view used to describe optical systems in a projector according to a fourth exemplary embodiment of the invention.

FIG. 4 is an exemplary block diagram used to describe optical systems in the projector of this embodiment. A projector 110 is a modification of the projector 10 of the first exemplary embodiment shown in FIG. 1, in which the color separation system 23 is modified, and no particular modification is added to the light source 21, the light modulation portion 25, the cross dichroic prism 27, and the projection lens 29.

In the projector 110, a color separation system 123 can include a cross dichroic mirror having two dichroic mirrors 123a and 123b that intersect with each other in the shape of a capital X, three field lenses 23g, 123h, and 223h, lenses LL1 and LL2, and reflection mirrors 123n and 123o. Of the lights of three colors including red, green, and blue, the first dichroic mirror 123a reflects a red light and transmits a blue light and a green light. In addition, the second dichroic mirror 123b reflects a blue light and transmits a red light and a green light. In the color separation system 123, a substantially white light-source light from the light source 21 goes incident on the cross dichroic mirrors 123a and 123b. The green light that has passed through the cross dichroic mirrors 123a and 123b goes incident on the third field lens 23g for use in adjusting an angle of incidence while remaining intact. The red light reflected on the first dichroic mirror 123a goes incident on the first field lens 123h for use in adjusting an angle of incidence by way of the lenses LL1 and LL2 and the reflection mirrors 123n and 123o. Further, the blue light reflected on the second dichroic mirror 123b goes incident on the second field lens 223h for use in adjusting an angle of incidence by way of the lenses LL1 and LL2 and the reflection mirrors 123n and 123o. In the first optical path OP1 and the second optical path OP2, the lenses LL1 and LL2 and the field lenses 123h and 223h constitute relay systems.

Each relay system can be furnished with a function of delivering an image from the first lens LL1 intact to the field lens 123h/223h via the second lens LL2. Distances from the light source 21 to the two liquid crystal light valves 25a and 25c are longer than a distance from the light source 21 to the liquid crystal light valve 25b. However, by disposing the relay systems in the optical paths OP1 and OP2, it is possible to prevent or reduce, to some extent, a decrease in efficiency for light utilization caused by light diffusion or the like induced by such a difference of optical paths.

In the color separation system 123 as described above, the third field lens 23g disposed in the third optical path OP3 for green lights can include a planoconvex lens. Meanwhile, the first and second field lenses 123h and 223h disposed, respectively, in the first optical path OP 1 for red lights and the second optical path OP2 for blue lights can include biconvex lenses by taking image-forming characteristics of the lenses LL1 and LL2 into account.

Let Rr, Rb, and Rg be the radii of curvature of the first through third field lenses 123h, 223h, and 23g, respectively, then an inequality as follows is satisfied:

$$Rg \geq Rb > Rr \quad (4)$$

In this exemplary embodiment, the third field lens 23g can include a planoconvex lens. However, the third field lens 23g can include a biconvex lens.

In this exemplary embodiment, because an inequality, Rb>Rr, is satisfied, a refractive power at the same reference wavelength is larger in the first field lens 123h for red lights than in the second field lens 223h for blue lights. Further, under these conditions, it is possible to make a refractive power of the first field lens 123h for red lights equal to a refractive power of the second field lens 223h for blue lights. In this case, because a chromatic aberration is corrected for red and blue, both the liquid crystal light valves 25a and 25c are illuminated by illumination areas of the same size. Further, because an inequality, Rg≥Rb, is satisfied in this exemplary embodiment, it is possible to make a refractive power of the third field lens 23g for green lights equal to or smaller than a refractive power of the second field lens 223h for blue lights or the like. This makes it possible to correct a chromatic aberration for green and blue or the like, too. The configuration as described above makes it possible to illuminate the respective liquid crystal light valves 25a, 25b, and 25c by illumination areas of the same size, and light modulation areas for respective colors provided in the respective liquid crystal light valves 25a through 25c are thereby illuminated, respectively, by illumination lights of red, green, and blue of the same size in agreement. It is thus possible to prevent or reduce a display shadow from being produced on the image projected onto the screen by the projection lens 29, which in turn enables a high-quality image to be projected.

Figure 5:
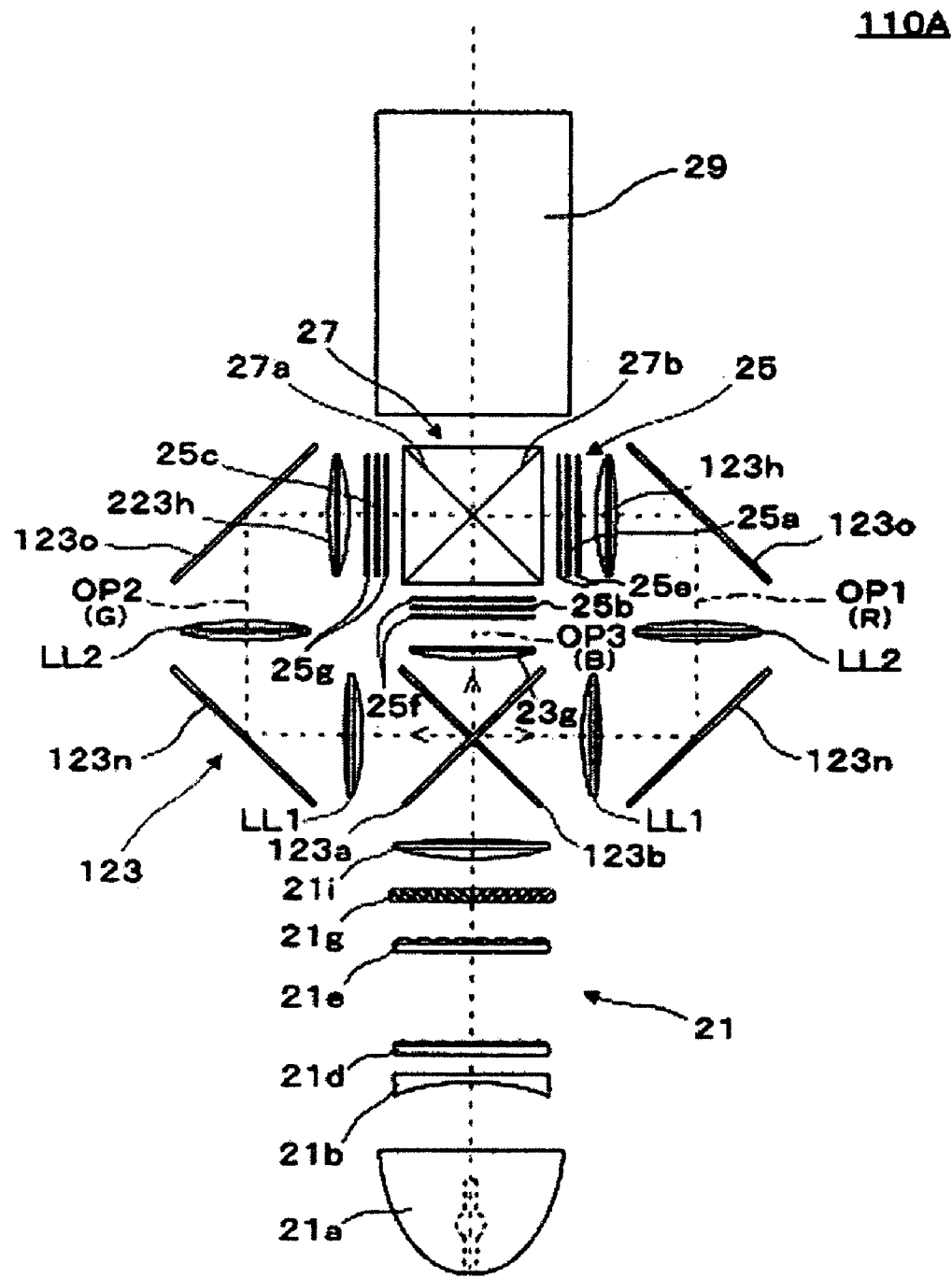
FIG. 5 is a view used to describe optical systems in a projector according to a fifth exemplary embodiment of the invention.

In the projector 110 of the fourth exemplary embodiment as described above, of the lengths of the optical paths of illumination lights of respective colors (lengths of the optical paths from the light source 21 to the respective liquid crystal light valves 25a through 25c), the lengths of the optical paths for red lights and blue lights are made equal, and made longer than the length of the optical path for green lights. On the contrary, in a projector 110A of this exemplary embodiment, as is shown in FIG. 5, the lengths of the optical paths for red lights and green lights are made longer than the length of the optical path for blue lights. In addition, the lengths of the optical paths for red lights and green lights are made equal, while the relay system is inserted in each of the optical paths. The projector 110A of this exemplary embodiment is different from the counterpart of the fourth exemplary embodiment in displacement of color lights; however, other than this difference, it is configured in the same manner as the counterpart of the fourth exemplary embodiment.

In this exemplary embodiment, the third field lens 23g disposed in the third optical path OP3 for blue lights comprises a planoconvex lens. Meanwhile, the first field lens 123h disposed in the first optical path OP1 for red lights and the second field lens 223h disposed in the second optical path OP2 for green lights comprise biconvex lenses to be matched with the relay systems in terms of image-forming characteristics or the like. Also, let Rr, Rg, and Rb be the radii of curvature of the first through third field lenses, respectively, then an inequality as follows is satisfied:

$$Rb > Rg > Rr \quad (5)$$

In this exemplary embodiment, the third field lens 23g comprises a planoconvex lens. However, it can include a biconvex lens.

In this exemplary embodiment, because an inequality, Rg>Rr, is satisfied, it is possible to make a refractive power of the first field lens 123h for red lights equal to a refractive power of the second field lens 223h for green lights, which makes it possible to correct a chromatic aberration for red and green. Likewise, because an inequality, Rb>Rg, is satisfied, it is possible to make a refractive power of the third field lens 23g for blue lights equal to or smaller than a refractive power of the second field lens 223h for green lights or the like. The configuration as described above makes it possible to correct a chromatic aberration for respective colors including red, green, and blue, and the respective liquid crystal light valves 25a, 25b, and 25c are thereby illuminated by illumination areas of the same size. It is thus possible to project a high-quality image by preventing or reducing a display shadow from being produced.

Figure 6:
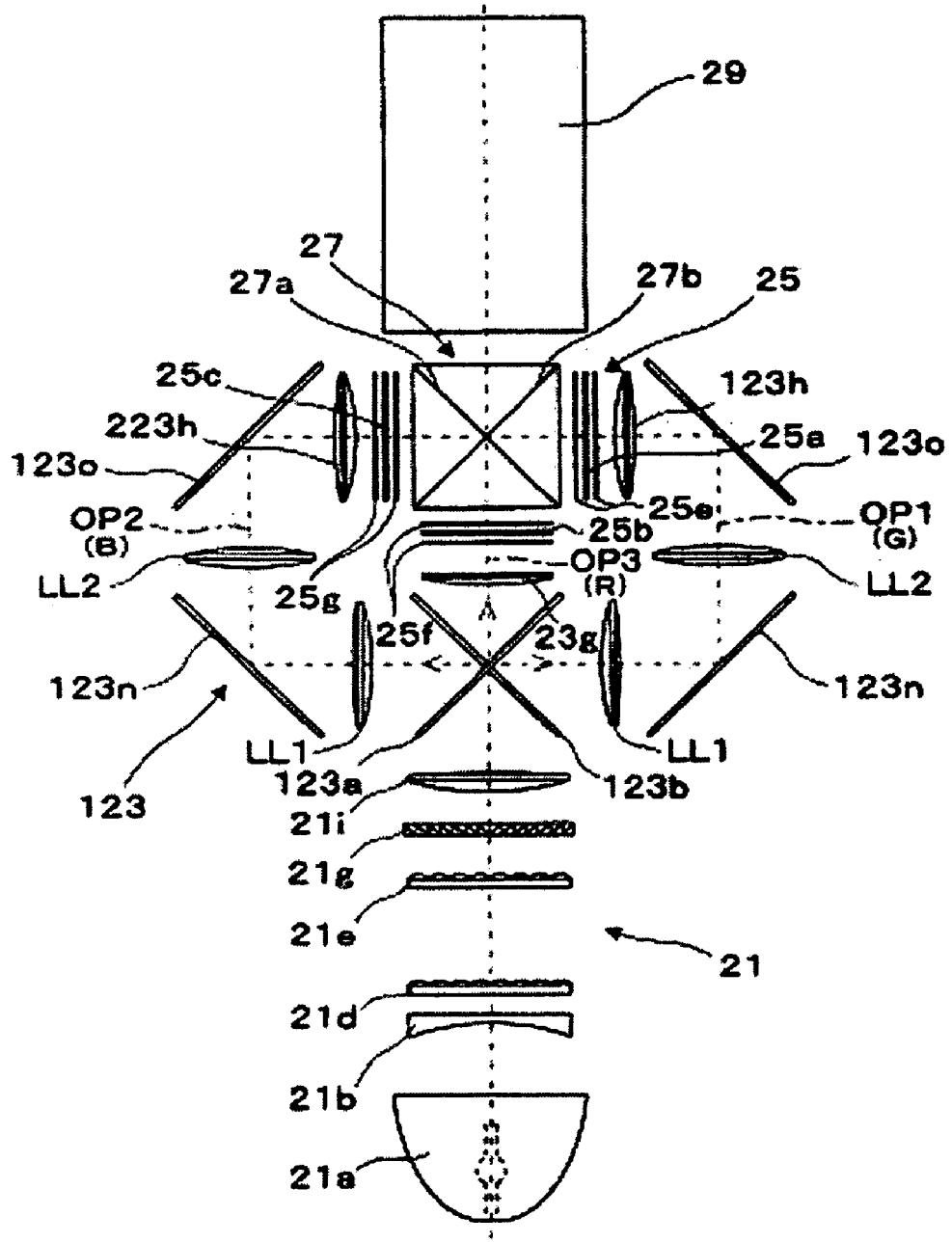
FIG. 6 is a view used to describe optical systems in a projector according to a sixth exemplary embodiment of the invention.

In a projector 110B of a sixth exemplary embodiment, as is shown in FIG. 6, of the lengths of the optical paths of illumination lights of respective colors (lengths of the optical paths from the light source 21 to the respective liquid crystal light valves 25a through 25c), the lengths of the optical paths for green lights and blue lights are made longer than the length of the optical path for red lights. In addition, the lengths of the optical paths for green lights and blue lights are made equal, while the relay system is inserted in each of the optical paths. The projector 10B of this exemplary embodiment is different from the counterpart of the fourth exemplary embodiment in displacement of color lights; however, other than this difference, it is configured in the same manner as the counterpart of the fourth exemplary embodiment.

In this exemplary embodiment, the third field lens 23g disposed in the third optical path OP3 for red lights comprises a planoconvex lens. Meanwhile, the first field lens 123h disposed in the first optical path for green lights and the second field lens 223h disposed in the second optical path for blue lights comprise biconvex lenses to be matched with the relay systems in terms of image-forming characteristic or the like. In addition, let Rg, Rb, and Rr be the radii of curvature of the first through third field lenses, respectively, then an inequality as follows is satisfied:

$$Rr \geq Rb > Rg \quad (6)$$

In this exemplary embodiment, the third field lens 23g comprises a planoconvex lens. However, it can include a biconvex lens.

In this exemplary embodiment, because an inequality, Rb>Rg, is satisfied, it is possible to make a refractive power of the first field lens 123h for green lights equal to a refractive power of the second field lens 223h for blue lights, which makes it possible to correct a chromatic aberration for green and blue. Likewise, because an inequality, Rr≧Rb, is satisfied, it is possible to make a refractive power of the third field lens 23g for red lights equal to or smaller than a refractive power of the second field lens 223h for blue lights or the like. The configuration as described above makes it possible to correct a chromatic aberration for respective colors including red, green, and blue, and the respective liquid crystal light valves 25a, 25b, and 25c are thereby illuminated by illumination areas of the same size. It is thus possible to project a high-quality image by preventing or reducing a display shadow from being produced.

While the invention has been described in line with the first through sixth exemplary embodiments, it should be understood that the invention is not limited to the exemplary embodiments above. For example, in the embodiments above, two fly's-eye systems 21d and 21e are used to separate lights from the light source lamp 21a into plural partial light beams. The invention, however, is also applicable to a projector that does not use such fly's-eye systems, that is, lens arrays. Further, the fly's-eye systems 21d and 21e may be replaced with rod integrators.

In addition, in the projectors 10, 10A, 10B, 110, 110A, and 110B above, the polarization converting member 21g is used to convert lights from the light source lamp 21a to polarized lights in a specific direction. The invention, however, is also applicable to a projector that does not use such a polarization converting member 21g.

Further, the projector includes a front projector that projects an image in a direction in which the user views the projection surface, and a rear projector that projects an image from the opposite side of the direction in which the user views the projection surface, and the structures of the projectors shown in FIG. 1 through FIG. 6 are all applicable to each type of projector.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector, comprising:
   a color separation system that causes illumination lights of first through third colors to branch from a light-source light emitted from a light source and guide the illumination lights of the first through third colors to first through third optical paths, respectively;
   first through third light modulation devices to be illuminated, respectively, by the illumination lights of the first through third colors and independently modulate the illumination lights of their respective colors;
   a distance from the light source to the third light modulation device being different from a distance from the light source to the first light modulation device and a distance from the light source to the second light modulation device;
   a relay system that is disposed in each of the first and second optical paths or in the third optical path alone; and
   a correcting system that corrects a chromatic aberration that affect sizes of illumination areas, for at least the first color and the second color, by adjusting an angle distribution of the illumination lights of the first through third colors that are incident on the first through third light modulation devices, the correcting system being disposed prior to the first through third light modulation devices in the first through third optical paths.

2. The projector according to claim 1,
   the correcting system including first and second field lenses each having a different refractive power with respect to a reference wavelength and being disposed, respectively, in the first and second optical paths oppositely to light-incident surface sides of the first and second light modulation devices, and a third field lens being disposed in the third optical path oppositely to a light-incident surface side of the third light modulation device.

3. The projector according to claim 2,
   the refractive power of the first field lens for the first color being almost equal to the refractive power of the second field lens for the second color.

4. The projector according to claim 2,
   the relay system being disposed in the third optical path.

5. The projector according to claim 4,
   the first and second field lenses include planoconvex lenses having flat surfaces, respectively, on sides of the first and second light modulation devices.

6. The projector according to claim 4,
   Rb>Rg, where the first through third colors are blue, green, and red, respectively, and Rb and Rg are radii of curvature of the first and second field lenses, respectively.

7. The projector according to claim 6, $Rg \geq Rr$, where Rr is a radius of curvature of the third field lens.

8. The projector according to claim 4, Rg>Rr, where the first through third colors are red, green, and blue, respectively, and Rr and Rg are radii of curvature of the first and second field lenses, respectively.

9. The projector according to claim 8, $Rr \geq Rb$ where Rb is a radius of curvature of the third field lens.

10. The projector according to claim 4, Rb>Rr, where the first through third colors are blue, red, and green, respectively, and Rb and Rr are radii of curvature of the first and second field lenses, respectively.

11. The projector according to claim 10,
    $Rr \geq Rg$, where Rg is a radius of curvature of the third field lens.

12. The projector according to claim 1,
    the relay system being disposed in each of the first and second optical paths.

13. The projector according to claim 12,
    the third field lens being a planoconvex lens having a flat surface on a side of the third light modulation device.

14. The projector according to claim 12,
    Rb>Rr, where the first through third colors are red, blue, and green, respectively, and Rr and Rb are radii of curvature of the first and second field lenses, respectively.

15. The projector according to claim 14,
    $Rg \geq Rb$, where Rg is a radius of curvature of the third field lens.

16. The projector according to claim 12,
    Rg>Rr, where the first through third colors are red, green, and blue, respectively, and Rr and Rg are radii of curvature of the first and second field lenses, respectively.

17. The projector according to claim 16,
    Rb>Rg, where Rb is a radius of curvature of the third field lens.

18. The projector according to claim 12,
    Rb>Rg, where the first through third colors are green, blue, and red, respectively, and Rg and Rb are radii of curvature of the first and second field lenses, respectively.

19. The projector according to claim 18,
    $Rr \geq Rb$, where Rr is a radius of curvature of the third field lens.

20. The projector according to claim 1, further comprising:
    a light combining member that combines and emits image lights of respective colors from the first through third light modulation devices; and
    a projection system that projects the image lights that have been combined by passing through the light combining system.

* * * * *